(12) United States Patent
Kozuki

(10) Patent No.: US 12,412,932 B2
(45) Date of Patent: Sep. 9, 2025

(54) RECTANGULAR SECONDARY BATTERY

(71) Applicant: Panasonic Corporation, Kadoma (JP)

(72) Inventor: Kiyomi Kozuki, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 490 days.

(21) Appl. No.: 16/969,451

(22) PCT Filed: Nov. 14, 2018

(86) PCT No.: PCT/JP2018/042063
§ 371 (c)(1),
(2) Date: Aug. 12, 2020

(87) PCT Pub. No.: WO2019/163220
PCT Pub. Date: Aug. 29, 2019

(65) Prior Publication Data
US 2020/0373548 A1    Nov. 26, 2020

(30) Foreign Application Priority Data

Feb. 21, 2018 (JP) .................................. 2018-028617

(51) Int. Cl.
*H01M 10/0585* (2010.01)
*H01M 50/534* (2021.01)
(Continued)

(52) U.S. Cl.
CPC ....... *H01M 10/0585* (2013.01); *H01M 50/54* (2021.01); *H01M 50/534* (2021.01);
(Continued)

(58) Field of Classification Search
CPC ............... H01M 50/54; H01M 50/543; H01M 10/0585; H01M 50/534; H01M 50/55;
(Continued)

(56) References Cited

U.S. PATENT DOCUMENTS 5,849,431 A    12/1998  Kita et al.
9,373,865 B2 *  6/2016  Holl ................... H01M 10/0431
(Continued)

FOREIGN PATENT DOCUMENTS

CN    107112488 A      8/2017
EP     3232495 A1 *  10/2017 ............. H01G 11/72
(Continued)

OTHER PUBLICATIONS

International Search Report dated Feb. 5, 2019, issud in counterpart Application No. PCT/JP2018/042063 (2 pages).
(Continued)

*Primary Examiner* — Matthew T Martin
*Assistant Examiner* — Taylor Harrison Krone
(74) *Attorney, Agent, or Firm* — WHDA, LLP

(57) ABSTRACT

A rectangular battery with a plurality of stacked positive electrode plates. Each positive electrode plate includes a positive electrode active material arrangement portion and a positive electrode collector tab, the positive electrode active material arrangement portion including a plate-like core body and a positive electrode active material containing layer that is provided at the core body, the collector tab being integrated with the core body and protruding from the positive electrode active material arrangement portion. Each positive electrode collector tab includes a curved portion that is positioned between the corresponding positive electrode active material arrangement portion and the positive electrode collector terminal in a Z direction (a region in the Z direction indicated by B), and has at least a part thereof curved.

5 Claims, 6 Drawing Sheets

(51) Int. Cl.
  *H01M 50/54* (2021.01)
  *H01M 50/55* (2021.01)
  *H01M 50/553* (2021.01)
  *H01M 50/562* (2021.01)
  *H01M 50/566* (2021.01)

(52) U.S. Cl.
  CPC .......... *H01M 50/55* (2021.01); *H01M 50/553* (2021.01); *H01M 50/562* (2021.01); *H01M 50/566* (2021.01)

(58) Field of Classification Search
  CPC . H01M 50/553; H01M 50/562; H01M 50/566
  See application file for complete search history.

(56) References Cited

U.S. PATENT DOCUMENTS

| | | | | |
|---|---|---|---|---|
| 9,559,444 | B1* | 1/2017 | Gisoldi | ................ H01R 11/282 |
| 2010/0055557 | A1 | 3/2010 | Meschter | |
| 2010/0190055 | A1* | 7/2010 | Khakhalev | .......... H01M 50/522 |
| | | | | 228/110.1 |
| 2015/0188146 | A1 | 7/2015 | Shinto et al. | |
| 2016/0336545 | A1 | 11/2016 | Wakimoto et al. | |
| 2016/0336580 | A1* | 11/2016 | Wakimoto | .......... H01M 50/578 |
| 2017/0133718 | A1* | 5/2017 | Suzuki | .............. H01M 10/0525 |
| 2017/0279157 | A1 | 9/2017 | Lee et al. | |
| 2017/0365839 | A1* | 12/2017 | Kawate | .................. H01G 11/82 |
| 2019/0379027 | A1 | 12/2019 | Fukunaga et al. | |

FOREIGN PATENT DOCUMENTS

| | | |
|---|---|---|
| JP | 9-92338 A | 4/1997 |
| JP | 2007-165117 A | 6/2007 |
| JP | 2013-196959 A | 9/2013 |
| JP | 2015-41523 A | 3/2015 |
| JP | 2015-103318 A | 6/2015 |
| JP | 2015-130253 A | 7/2015 |
| JP | 2015-219982 A | 12/2015 |
| JP | 2015-225755 A | 12/2015 |
| JP | 2016-219124 A | 12/2016 |
| WO | 2014/003185 A1 | 1/2014 |
| WO | 2014/013992 A1 | 1/2014 |
| WO | 2016093338 A1 | 6/2016 |
| WO | WO-2017047278 A1 * | 3/2017 ............ H01M 10/04 |
| WO | 2018/003843 A1 | 1/2018 |

OTHER PUBLICATIONS

English Translation of Search Report dated Mar. 24, 2022, issued in counterpart Application No. 201880088901.7. (3 pages).

Extended (Supplementary) European Search Report dated Apr. 12, 2021, issued in counterpart EP application No. 18907144.2. (7 pages).

* cited by examiner

RECTANGULAR SECONDARY BATTERY

TECHNICAL FIELD

The present disclosure relates to a rectangular secondary battery.

BACKGROUND ART

FIG. 13 is a schematic sectional view of an upper side of a rectangular secondary battery 300 that is described in Patent Literature 1. As shown in FIG. 13, the rectangular secondary battery 300 includes a rectangular outer casing 310, an electrode body 311, and a collector body 312; and the electrode body 311 and the collector body 312 are disposed in the rectangular outer casing 310. The electrode body 311 includes a plurality of stacked electrode plates 317. Tabs 314 protrude from the corresponding electrode plates 317, and the plurality of tabs 314 that protrude from the plurality of electrode plates 317 are disposed so as to overlap each other and constitute tab bundles 315. Each tab bundle 315 is welded to the collector body 312 and is electrically joined to the collector body 312. Tabs 314a that are flush with the electrode plates 317 from which they protrude exist in the tab bundles 315 in a region between the electrode body 311 and the collector body 312 (a region having a range indicated by G). Tension is applied to the tabs 314a, and the tabs 314a are in a state in which they are not loose at all.

FIG. 14 is a schematic sectional view of an upper side of a rectangular secondary battery 400 that is described in Patent Literature 2. As shown in FIG. 14, the rectangular secondary battery 400 includes a rectangular outer casing 410, an electrode body (not shown), a lead 412, and an auxiliary lead 413; and the electrode body, the lead 412, and the auxiliary lead 413 are disposed in the rectangular outer casing 410. The lead 412 and the auxiliary lead 413 constitute a collector body. In the rectangular secondary battery 400, a tab bundle 415 that protrudes from the electrode body is interposed between the lead 412 and the auxiliary lead 413, and is welded. As in the rectangular secondary battery 300, in the rectangular secondary battery 400, tabs 419 that are flush with electrode plates from which they protrude exist in the tab bundle 415 in a region between the electrode body and the auxiliary lead 413. Tension is applied to the tabs 419, and the tabs 419 are in a state in which they are not loose at all.

CITATION LIST

Patent Literature

PTL 1: Japanese Published Unexamined Patent Application No. 2015-103318
PTL 2: Japanese Published Unexamined Patent Application No. 2015-130253

SUMMARY OF INVENTION

In the rectangular secondary battery 300, the tabs 314a that are subjected to tension and are not loose at all exist between the electrode body 311 and the collector body to which the tab bundles 315 are joined; and, in the rectangular secondary battery 400, the tabs 419 that are subjected to tension and are not loose at all exist between the electrode body 311 and the collector body to which the tab bundle 415 is joined. Therefore, when the rectangular secondary batteries 300 and 400 are subjected to shock or vibration and a force acts upon the tab bundles 315 and the tab bundle 415 in an extension direction, the tabs 314a and the tabs 419 that are not loose at all are pulled and tend to be damaged.

Accordingly, it is an object of the present disclosure to provide a rectangular secondary battery in which all tabs are unlikely to become damaged even if the rectangular secondary battery is subjected to shock or vibration.

To this end, a rectangular secondary battery according to the present disclosure includes an electrode body that includes a plurality of stacked electrode plates; a rectangular outer casing that has an opening and that accommodates the electrode body; a cover plate that seals the opening and that is provided with an external terminal on a side opposite to a side of the electrode body; and a collector terminal that is electrically connected to the external terminal and that is disposed inside the rectangular outer casing, wherein each electrode plate includes an active material arrangement portion and a collector tab, the active material arrangement portion including a plate-like core body and an active material containing layer that is provided at the core body, the collector tab being integrated with the core body and protruding from the active material arrangement portion, wherein each collector tab includes a curved portion and an end, the curved portion being positioned between the active material arrangement portion corresponding thereto and the collector terminal in a height direction of the rectangular outer casing and having at least a part thereof curved, the end being positioned at the curved portion on a side opposite to a side of the active material arrangement portion, and wherein each end includes a joint portion that is joined and electrically connected to the collector terminal.

In the present description, an external terminal is defined as a terminal portion of the rectangular secondary battery to which an external wire, constituted by, for example, a bus bar, is electrically connected. The height direction is defined as a direction normal to a plate-like portion of the cover plate including the plate-like portion; and a side where the external terminal exists is an upper side in the height direction, and a side opposite to the side of the external terminal is a lower side in the height direction.

According to the rectangular secondary battery according to the present disclosure, all tabs can be made unlikely to become damaged even if the rectangular secondary battery is subjected to shock or vibration.

DESCRIPTION OF EMBODIMENTS

An embodiment according to the present disclosure is described in detail below with reference to the attached drawings. When, in the description below, for example, a plurality of embodiments and modifications are included, providing a new embodiment by combining features of the plurality of embodiments and modifications as appropriate is assumed from the outset. In the description and the drawings below, an X direction indicates a thickness direction of positive electrode plates 20 that are described below, and is the same as a stacking direction of the plurality of positive electrode plates 20. A Y direction indicates one direction in a two dimensional plane in which the positive electrode plates 20 extend, and a Z direction indicates a height direction of a rectangular outer casing 11 that is described below and is the same as a direction that is normal to a plate-like portion of a cover plate 12 that is described below. The X direction, the Y direction, and the Z direction are orthogonal to each other.

Figure 1:
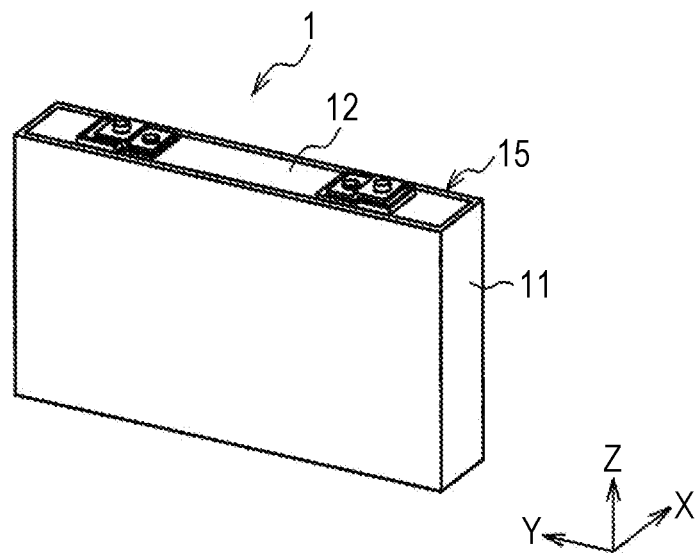
FIG. 1 is a perspective view of a rectangular secondary battery according to an embodiment of the present disclosure.
Figure 2:
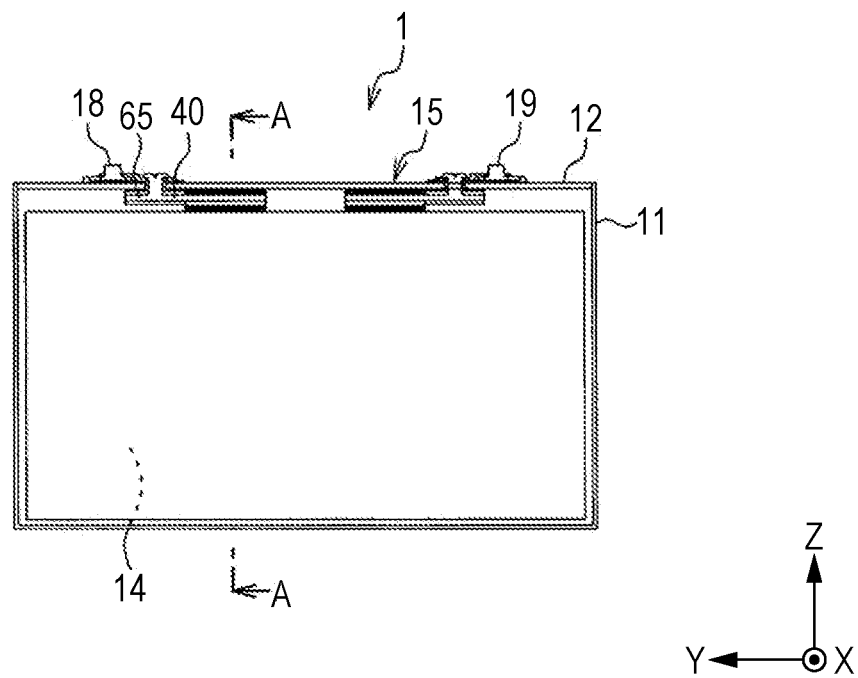
FIG. 2 illustrates the rectangular secondary battery from a side thereof, and is a transparent view showing an internal structure.
Figure 3:
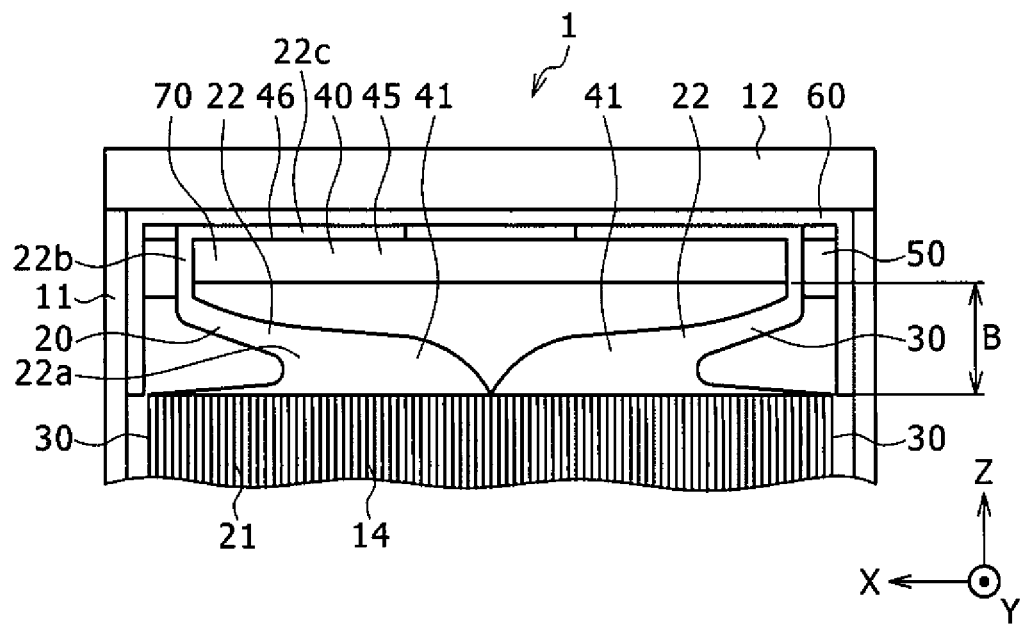
FIG. 3 is a partial sectional view showing an upper portion of a sectional view along line A-A of FIG. 2.

FIG. 1 is a perspective view of a rectangular secondary battery (hereunder simply referred to as "rectangular battery") 1 according to an embodiment of the present disclosure. FIG. 2 illustrates the rectangular battery 1 from a side thereof, and is a transparent view showing an internal structure. FIG. 3 is a partial sectional view showing an upper portion of a sectional view along line A-A of FIG. 2. As shown in FIGS. 1 and 2, the rectangular battery 1 includes the rectangular outer casing (rectangular outer can) 11, the cover plate 12, and a stack-type electrode body 14. The rectangular outer casing 11 is made of, for example, a metal, desirably, aluminum or an aluminum alloy, and has an opening on an upper side in the Z direction. The rectangular battery 1 includes an insulating sheet (not shown), and the insulating sheet is disposed so as to cover an inner surface of the rectangular outer casing 11 excluding the opening side of the rectangular outer casing 11. The rectangular outer casing 11 may be constituted by an insulator, such as synthetic resin, in which case, the insulating sheet can be omitted.

Although described below, for example, the electrode body 14 is fixed to the cover plate 12. After fixing, for example, the electrode body 14 to the cover plate 12, the cover plate 12 is fitted to the opening of the rectangular outer casing 11. By joining the cover plate 12 and a fitting portion of the rectangular outer casing 11 by, for example, laser welding, the cover plate 12 is integrated with the rectangular outer casing 11 to form a rectangular battery case 15.

Figure 4:
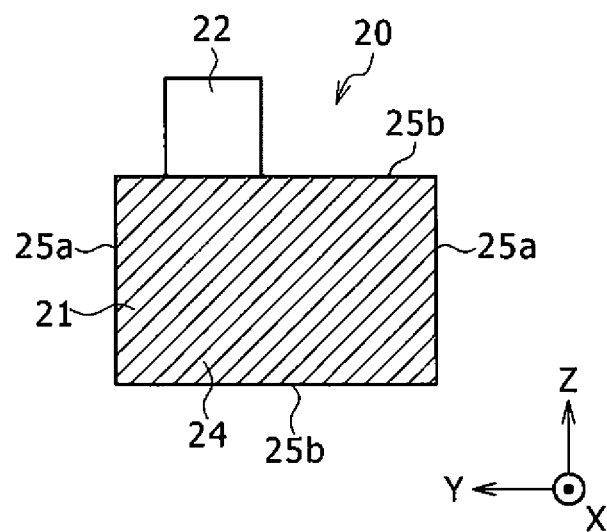
FIG. 4 is a plan view of a positive electrode plate of the rectangular secondary battery when seen in a thickness direction thereof.
Figure 5:
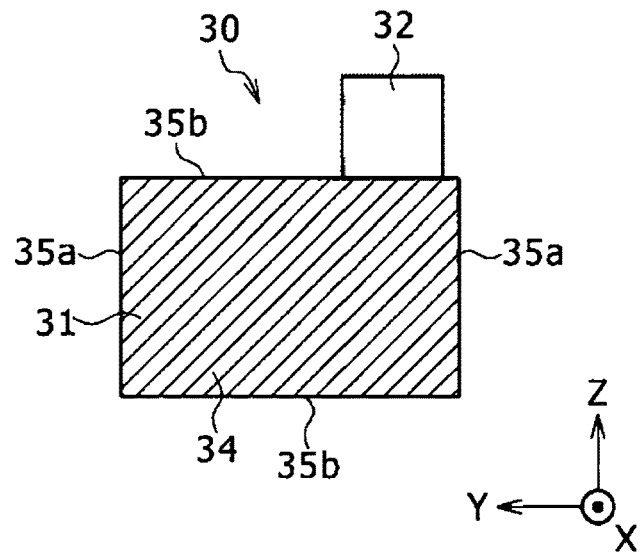
FIG. 5 is a plan view of a negative electrode plate of the rectangular secondary battery when seen in a thickness direction thereof.
Figure 6:
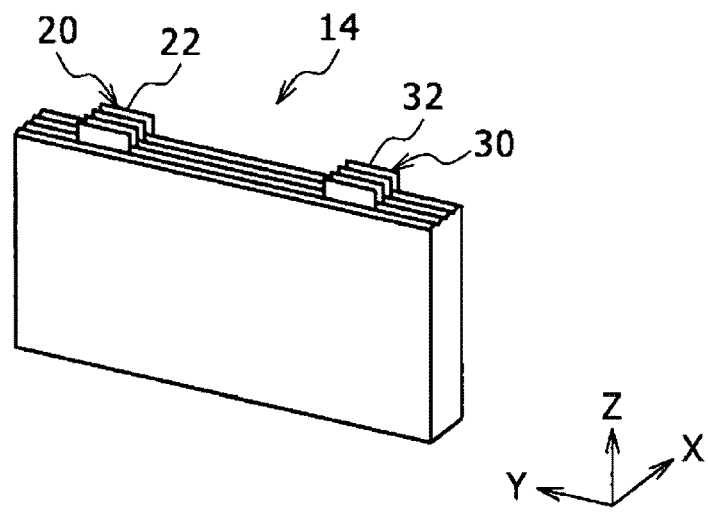
FIG. 6 is a perspective view of an electrode body of the rectangular secondary battery.

As shown in FIG. 3, the electrode body 14 includes the plurality of positive electrode plates 20, a plurality of negative electrode plates 30, and a plurality of separators (not shown). The number of positive electrode plates 20 and the number of negative electrode plates 30 are, for example, greater than or equal to 70 and less than or equal to 80. The negative electrode plates 30 are disposed on two sides of the electrode body 14. The number of positive electrode plates and the number of negative electrode plates 30 may be less than 70 or greater than 80. The electrode body 14 is accommodated inside the rectangular outer casing 11. Next, the structures of the positive electrode plates 20, the negative electrode plates 30, and the electrode body 14 are described in detail. FIG. 4 is a plan view of a positive electrode plate 20 when seen in the thickness direction (the X direction) thereof. FIG. 5 is a plan view of a negative electrode plate 30 when seen in the thickness direction (the X direction) thereof. FIG. 6 is a perspective view of the electrode body 14.

As shown in FIG. 4, each positive electrode plate 20 includes a positive electrode active material arrangement portion 21 and a positive electrode collector tab 22. Each positive electrode active material arrangement portion 21 includes a plate-like positive electrode core body and a positive electrode active material containing layer 24 that is applied to two surfaces of the positive electrode core body. The positive electrode collector tabs 22 protrude from the positive electrode active material arrangement portions 21. In the example shown in FIG. 4, each positive electrode active material arrangement portion 21 has a substantially rectangular shape in side view. One pair of edges 25*a* of each positive electrode active material arrangement portion 21 extend substantially parallel to the Z direction, and the other pair of edges 25*b* thereof extend substantially in the Y direction. Each positive electrode collector tab 22 is made of a material that is the same as the material of each positive electrode core body and is integrated with its corresponding positive electrode core body. Each positive electrode collector tab 22 has a substantially rectangular shape in side view, and protrudes upward in the Z direction from one side in the Y direction of the upper edge 25*b* of its corresponding positive electrode active material arrangement portion 21. One pair of edges of each positive electrode collector tab 22 extend substantially parallel to the Z direction, and the other pair of edges thereof extend substantially parallel to the Y direction.

As shown in FIG. 5, each negative electrode plate 30 includes a negative electrode active material arrangement portion 31 and a negative electrode collector tab 32. Each negative electrode active material arrangement portion 31 includes a plate-like core body and a negative electrode active material containing layer 34 that is applied to two surfaces of the negative electrode core body. Each negative electrode collector tab 32 protrudes from its corresponding negative electrode active material arrangement portion 31. In the example shown in FIG. 5, each negative electrode active material arrangement portion 31 has a substantially rectangular shape in side view. One pair of edges 35*a* of each negative electrode active material arrangement portion 31 extend substantially parallel to the Z direction, and the other pair of edges 35b thereof extend substantially in the Y direction. Each negative electrode collector tab 32 is made of a material that is the same as the material of each negative electrode core body and is integrated with its corresponding negative electrode core body. Each negative electrode collector tab 32 has a substantially rectangular shape in side view, and protrudes upward in the Z direction from the other side in the Y direction of the upper edge 35b of its corresponding negative electrode active material arrangement portion 31. One pair of edges of each negative electrode collector tab 32 extend substantially parallel to the Z direction, and the other pair of edges thereof extend substantially parallel to the Y direction.

Referring to FIG. 6, the positive electrode plates 20 and the negative electrode plates 30 are alternately stacked via the separators with the positive electrode collector tabs 22 and the negative electrode collector tabs 32 being disposed so as to protrude upward in the Z direction. By the stacking, the electrode body 14 is formed. As shown in FIGS. 4 and 5, the area of each negative electrode active material arrangement portion 31 in side view is larger than the area of each positive electrode active material arrangement portion 21 in side view. Although described below, the electrode body 14 is joined to a positive electrode terminal and a negative electrode terminal that are disposed inside the rectangular outer casing 11, and is disposed at a predetermined position inside the rectangular outer casing 11. When seen from the X direction with the electrode body 14 disposed at the predetermined position, all of the positive electrode active material arrangement portions 21 overlap the negative electrode active material arrangement portions 31, and ring-shaped peripheral portions of the negative electrode active material arrangement portions 31 do not overlap the positive electrode active material arrangement portions 21. The thickness of each positive electrode core body is larger than the thickness of each negative electrode core body.

In a lithium-ion secondary battery, when the plate width of each positive electrode plate is larger than the plate width of each negative electrode plate, during charging, lithium ions that exit from a positive electrode active material of each positive electrode plate protruding from the plate width of each negative electrode plate concentrates on both end portions of each negative electrode plate, and a lithium dendrite tends to precipitate. The precipitation of lithium dendrite occurs more easily when the thickness of each negative electrode core body is larger than the thickness of each positive electrode core body. The precipitation of lithium dendrite causes deterioration of the battery, such as a reduction in the capacity maintaining rate when charging and discharging of electricity are repeated. In the present embodiment, by causing the thickness of each positive electrode core body to be larger than the thickness of each negative electrode core body and causing all of the positive electrode active material arrangement portions 21 to overlap the negative electrode active material arrangement portions 31, precipitation of lithium dendrite is suppressed to suppress, for example, a reduction in the capacity maintaining rate when charging and discharging of electricity are repeated.

The positive electrode core bodies and the positive electrode collector tabs 22 are made of, for example, an aluminum or an aluminum alloy foil. The positive electrode active material containing layers 24 can be formed by using, for example, lithium-nickel oxides as a positive electrode active material, acetylene black (AB) as a conductive agent, polyvinylidene fluoride (PVDF) as a binding agent, and N-methyl-2-pyrrolidone as a dispersion medium. When the positive electrode active material is described in more detail, as the positive electrode active material, any material may be selected as appropriate and used as long as the material is a compound that allows lithium ions to be reversibly occluded/discharged. As such positive electrode active materials, lithium transition metal composite oxides are desirable. For example, lithium transition metal composite oxides that are represented by $LiMO_2$ (where M is at least one type selected from Co, Ni, and Mn) that allows lithium ions to be reversibly occluded/discharged, that is, $LiCoO_2$, $LiNiO_2$, $LiNi_yCo_{1-y}O_2$ (y=0.01~0.99), $LiMnO_2$, or $LiCoO_xMn_yNi_zO_2$ (x+y+z=1); or $LiMn_2O_4$ or $LiFePO_4$ may be used in such a way that one type is used singly or a plurality of types are mixed and used. Further, lithium cobalt composite oxides to which dissimilar metal elements such as zirconium, magnesium, aluminum, and tungsten are added are usable. However, the positive electrode active material containing layers 24 may be made of any other publicly known materials other than those mentioned above.

The positive electrode active material arrangement portions 21 are produced, for example, as follows. A positive electrode active material is mixed with, for example, a conductive agent and a binding agent, and this mixture is kneaded in a dispersion medium to produce a paste-like positive electrode active material slurry. Thereafter, the positive electrode active material slurry is applied to each positive electrode core body. Then, when the positive electrode active material slurry applied to the positive electrode core bodies is dried and compressed, the positive electrode active material arrangement portions 21 are formed.

The negative electrode core bodies and the negative electrode collector tabs 32 are made of, for example, a copper or a copper alloy foil. The negative electrode active material of the negative electrode active material containing layers 34 is not particularly limited as long as the material is one that that allows lithium to be reversibly occluded/discharged. For example, carbon materials, silicon materials, lithium metal, metals that form an alloy with lithium or alloy materials thereof, or metal oxides can be used. From the viewpoint of material costs, it is desirable to use carbon materials as the negative electrode active material. For example, natural graphite, artificial graphite, mesophase pitch-based carbon fiber (MCF), mesocarbon microbeads (MCMB), coke, or hard carbon can be used. In particular, from the viewpoint of increasing high charge-discharge rate characteristics, as the negative electrode active material, it is desirable to use carbon materials formed by covering graphite material with low crystalline carbon.

It is desirable to form the negative electrode active material containing layers 34 by using styrene-butadiene copolymer rubber particle dispersion (SBR) as a binding agent, carboxymethyl cellulose (CMC) as a thickening agent, and water as a dispersion medium. The negative electrode active material arrangement portions 31 are produced, for example, as follows. A negative electrode active material is mixed with, for example, a conductive agent and a binding agent, and this mixture is kneaded in a dispersion medium to produce a paste-like negative electrode active material slurry. Thereafter, the negative electrode active material slurry is applied to each negative electrode core body. Then, when the negative electrode active material slurry applied to the negative electrode core bodies is dried and compressed, the negative electrode active material arrangement portions 31 are formed.

As the separators, publicly known separators that are generally used in nonaqueous electrolyte secondary batteries can be used. For example, it is desirable to use separators made of polyolefin. Specifically, not only separators made of polyethylene but also separators having a polypropylene layer formed on a polyethylene surface or separators having an aramid-based resin applied to a surface of polyethylene separators may be used.

Inorganic filler layers may be formed at interfaces between the positive electrode plates 20 and the separators to interfaces between the negative electrodes 30 and the separators. As a filler, oxides or phosphate compounds using one or a plurality of, for example, titanium, aluminum, silicon, and magnesium; or those whose surface is treated with, for example, hydroxides can be used. The filler layers may be formed by directly applying slurry that contains the filler to the positive electrode plates 20, the negative electrode plates 30, or the separators; or may be formed by attaching sheets formed from the filler to the positive electrode plates 20, the negative electrode plates 30, or the separators.

Referring again to FIG. 3, the rectangular battery 1 further includes a positive electrode collector terminal 40, metal positive-electrode-side covers 50, serving as examples of clamping portions, and a resin insulating cover 60. The positive electrode collector terminal 40 is disposed inside the rectangular outer casing 11 and extends in the X direction. The plurality of positive electrode collector tabs 22 that are included in the plurality of positive electrode plates 20 are separated in two and are disposed so as to overlap each other, and form two bundles. The two bundles each constitute a positive-electrode-side tab bundle 41. The positive electrode collector terminal 40 and each positive-electrode-side cover 50 are desirably made of aluminum, and are integrated with each other.

Figure 7:
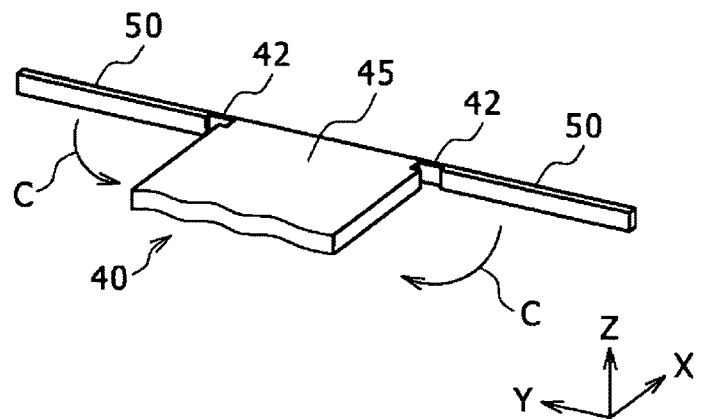
FIG. 7 is a perspective view illustrating a structure of a part of a positive electrode collector terminal and a structure of a part of each positive-electrode-side cover (clamping portion) that are formed in an integral structure.

FIG. 7 is a perspective view illustrating a structure of a part of the positive electrode collector terminal 40 and a structure of a part of each positive-electrode-side cover 50 and illustrating an integral structure thereof. As shown in FIG. 7, the positive electrode collector terminal 40 includes a plate-like portion 45. The rectangular battery 1 includes two positive-electrode-side covers 50, and each positive-electrode-side cover 50 is connected to the positive electrode collector terminal 40 by a corresponding connecting portion 42. The positive-electrode-side covers 50 and the connecting portions 42 have a rod-like shape and are integrated with each other, and extend in the X direction from one side end portion of the positive electrode collector terminal 40 in the Y direction. The thickness of each connecting portion 42 is smaller than the thickness of each positive-electrode-side cover 50. One of the positive-electrode-side tab bundles 41 is caused to extend upward in the Z direction from a lower side of the positive electrode collector terminal 40 in the Z direction so as to contact one side edge portion in the X direction on one side of the positive electrode collector terminal 40 in the Y direction, and the other positive-electrode-side tab bundle 41 is caused to extend upward in the Z direction from the lower side of the positive electrode collector terminal 40 in the Z direction so as to contact the other side end portion in the X direction on one side of the positive electrode collector terminal 40 in the Y direction.

Thereafter, with connection portions of the positive-electrode-side covers 50 that are connected with the corresponding connecting portions 42 being fulcra, the positive-electrode-side covers 50 are bent in XY planes so as to rotate in the directions of arrows C, and thereby a part of each positive-electrode-side tab bundle 41 is clamped by the corresponding positive-electrode-side cover 50 and the corresponding edge portion of the positive electrode collector terminal 40 in the X direction. Since the thickness of each connecting portion 42 is smaller than the thickness of each positive-electrode-side cover 50 and the connecting portions 42 are less rigid than the positive-electrode-side covers 50, it is possible to smoothly bend the positive-electrode-side covers 50.

Figure 8:
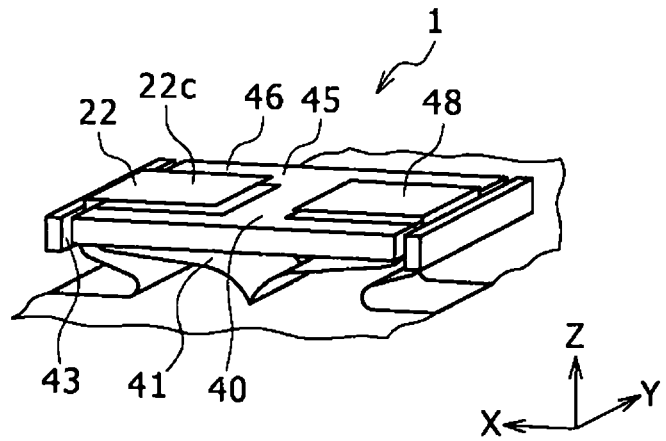
FIG. 8 is a perspective view of a vicinity of a part of the positive electrode collector terminal in the rectangular secondary battery.

Thereafter, as shown in FIG. 8, that is, a perspective view of a vicinity of a part of the positive electrode collector terminal 40 in the rectangular battery 1, an end of each positive-electrode-side tab bundle 41 on a side opposite to the side of its corresponding positive electrode active material arrangement portion 21 turns back so as to extend in the X direction along an upper surface 46 of the plate-like portion 45 of the positive electrode collector terminal 40. Although described in detail later, in the rectangular battery 1, the plate-like portion 45 of the positive electrode collector terminal 40 is disposed substantially parallel to the plate-like portion of the cover plate 12. A surface of the plate-like portion 45 on a side opposite to the side of the positive electrode active material arrangement portions 21 is a surface of the plate-like portion 45 on the side of the cover plate 12 in the Z direction, and constitutes the upper surface 46 of the plate-like portion 45. After the turning back above, the positive electrode collector terminal 40, the positive-electrode-side covers 50, and the connecting portions 42 define recessed portions 43 that accommodate parts of the positive-electrode-side tab bundles 41.

As shown in FIG. 8, each positive electrode collector tab 22 includes a flat portion 22c that extends along the upper surface 46 of the plate-like portion 45. When seen from the Z direction, there exist overlapping portions 48 where all of the flat portions 22c of all of the positive electrode collector tabs 22 included in the positive-electrode-side tab bundles 41 overlap each other. The overlapping portions 48 are joined to the upper surface 46 of the plate-like portion 45 by, for example, ultrasonic welding, laser welding, TIG welding, or resistance welding, and are electrically connected to the plate-like portion 45. In other words, a joint portion of each positive electrode collector tab 22 that is joined to the positive electrode collector terminal 40 is included in the overlapping portions 48.

It is desirable that the length of each overlapping portion 48 in a protruding direction of the positive electrode collector tabs 22 be greater than or equal to 3 mm because all of the positive electrode collector tabs 22 that are included in the positive-electrode-side tab bundles 41 can be reliably joined to the plate-like portion 45. However, the length may be less than 3 mm. It is desirable that the length of each overlapping portion 48 in the protruding direction of the positive electrode collector tabs 22 be less than or equal to 10 mm because material costs can be reduced and downsizing is easily realized. However, the length of each overlapping portion 48 in the protruding direction of the positive electrode collector tabs 22 may be greater than 10 mm.

Figure 9:
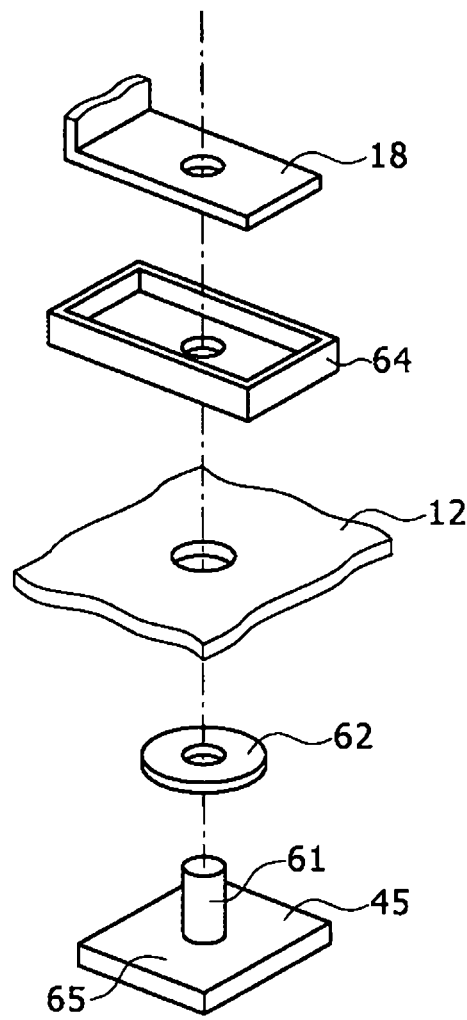
FIG. 9 is an exploded perspective view of an electrical connection portion where the positive electrode collector terminal is electrically connected to a positive-electrode-side external terminal provided on an outer side of a cover plate.

Referring to FIG. 2 again, the positive electrode collector terminal 40 includes an external terminal connecting portion 65 on a side opposite to the joint portion of each positive electrode collector tab 22 in the Y direction. The external terminal connecting portion 65 is electrically connected to a positive-electrode-side external terminal 18 provided on an outer side of the cover plate 12. FIG. 9 is an exploded perspective view of an electrical connection portion thereof. As shown in FIG. 9, the external terminal connecting portion 65 includes a circular columnar rivet portion 61 that protrudes upward from the plate-like portion 45. The rivet 61 is passed through a through hole of a hollow disk-shaped insulator 62, a through hole provided in the plate-like portion of the cover plate 12, a through hole provided in an insulator 64, and a through hole provided in the positive-electrode-side external terminal 18. The rivet 61 is inserted with the insulating cover 60 (see FIG. 3), made of an insulating material such as resin, disposed between the positive electrode collector terminal 40 and the cover plate 12.

After inserting the rivet 61, the rivet 61 is crimped. When the rivet 61 has been crimped, the rivet 61, the insulator 62, the insulating cover 60, the cover plate 12, the insulator 64, and the positive-electrode-side external terminal 18 are integrated with each other, and the rivet 61 of the positive electrode collector terminal 40 is electrically connected to the positive-electrode-side external terminal 18.

As described above, the positive electrode plates 20 are joined to the positive electrode collector terminal 40. Therefore, by crimping the rivet 61, the plurality of positive electrode plates 20, the positive electrode collector terminal 40, the insulating cover 60, and the cover plate 12 are integrated with each other. Although not described, the plurality of negative electrode plates 30, a copper negative electrode collector terminal (not shown), the insulating cover 60, and the cover plate 12 are also integrated with each other by a structure similar to that on the positive electrode side. As a result, the electrode body 14, the positive electrode collector terminal 40, the negative electrode collector terminal, the insulating cover 60, and the cover plate 12 are integrated into an integral structure. Although the case in which the positive electrode collector terminal 40 is integrated with the cover plate 12 by crimping is described, the positive electrode collector terminal may be fixed to the cover plate by other joining means such as welding.

Figure 10:
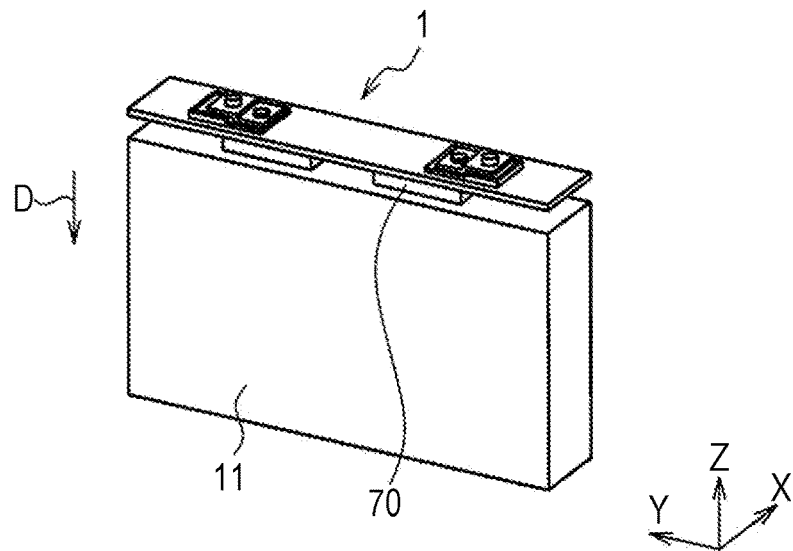
FIG. 10 is a perspective view illustrating the rectangular secondary battery where the cover plate to which, for example, the positive electrode collector terminal is fixed is mounted on a rectangular outer casing.

FIG. 10 is a perspective view illustrating the rectangular battery 1 when the integral structure 70 is mounted in the rectangular outer casing 11 whose inner surface is covered by the insulating sheet. As shown in FIG. 10, with the electrode body 14 (see FIG. 6) disposed on a lower side in the Z direction, the integral structure 70 is moved relative to the rectangular outer casing 11 in the Z direction indicated by arrow D, and a portion other than the cover plate 12 is inserted into the rectangular outer casing 11. Thereafter, as described above, the cover plate 12 is joined to an opening-side edge portion of the rectangular outer casing 11 by, for example, laser welding.

Referring to FIG. 3 again, the insulating cover 60 has a substantially U shape in cross section, and, when the integral structure 70 is mounted in the rectangular outer casing 11, the insulating cover 60 is fitted to inner surfaces of a pair of side plates of the rectangular outer casing 11 that face each other in the X direction by press-fitting. With the cover plate 12 joined to the opening-side end portion of the rectangular outer casing 11, parts of the positive-electrode-side tab bundles 41 are clamped by the corresponding positive-electrode-side covers 50 and the corresponding edge portions of the positive electrode collector terminal 40 in the X direction, and the positive-electrode-side covers 50 are subjected to a force on the side of the positive electrode collector terminal 40 in the X direction from the insulating cover 60.

With the cover plate 12 joined to the opening-side edge portion of the rectangular outer casing 11, each positive electrode collector tab 22 includes a curved portion 22a, an extending portion 22b in the height direction, and the flat portion 22c. Each extending portion 22b in the height direction and each flat portion 22c constitute an end. Each curved portion 22a is positioned between its corresponding positive electrode active material arrangement portion 21 and the positive electrode collector terminal 40 in the Z direction (a region in the Z direction indicated by a range B), and has at least a part thereof curved. Each extending portion 22b in the height direction is connected to an end portion of its corresponding curved portion 22a on a side opposite to the side of the positive electrode active material arrangement portion 21, and extends in the Z direction. Parts of the extending portions 22b in the height direction are clamped by the corresponding positive-electrode-side covers 50 and the corresponding edge portions of the positive electrode collector terminal 40 in the X direction. The flat portions 22c are connected to end portions of the corresponding extending portions 22b in the height direction on a side opposite to the side of the curved portions 22a, and extend along the upper surface 46 of the plate-like portion 45 of the positive electrode collector terminal 40. The flat portions 22c include the joint portions that are joined to the positive electrode collector terminal 40.

When the mounting of the integral structure 70 into the rectangular outer casing 11 is completed, a nonaqueous electrolyte is injected via an injection hole (not shown) provided in the cover plate 12. Thereafter, a predetermined charging operation is performed by using the positive-electrode-side external terminal 18 and a negative-electrode-side external terminal 19 (refer to FIG. 2), and, after a reaction gas that is generated by a charging reaction of the battery has been previously generated, the electrolyte injection hole is hermetically sealed, so that the rectangular battery 1 is produced. The electrolyte injection hole is sealed by, for example, using a blind rivet or performing welding. The electrolyte injection hole is sealed in a dry air environment in which an inert gas atmosphere (rare gases such as $N_2$ or Ar) or the moisture content is controlled. In this way, abnormal deterioration of the battery caused by moisture entering the battery case 15 and reacting with the electrolyte is prevented from occurring.

Solvents of the nonaqueous electrolyte are not particularly limited, so that solvents that have been hitherto used in nonaqueous electrolyte secondary batteries can be used. For example, cyclic carbonates, such as ethylene carbonate (EC), propylene carbonate (PC), butylene carbonate, and vinylene carbonate (VC); chain carbonates, such as dimethyl carbonate (DMC), methyl ethyl carbonate (MEC), and diethyl carbonate (DEC); ester-containing compounds, such as methyl acetate, ethyl acetate, propyl acetate, methyl propionate, ethyl propionate, and γ-butyrolactone; sultone-group-containing compounds, such as propane sultone; ether-containing compounds, such as 1,2-dimethoxyethane, 1,2-diethoxyethane, tetrahydrofuran, 1,2-dioxane, 1,4-dioxane, and 2-methyltetrahydrofuran; nitrile-containing compounds, such as butyronitrile, valeronitrile, n-heptanenitrile, succinonitrile, glutarnitrile, adiponitrile, pimelonitrile, 1,2,3-propanetricarbonitrile, and 1,3,5-pentanetricarbonitrile; and amide-containing compounds, such as dimethylformamide, can be used. In particular, solvents in which a part of H of these substances is substituted by F are desirably used. The substances can be used singly, or a plurality of such substances can be used in combination. In particular, solvents in which a cyclic carbonate and a chain carbonate are combined with each other, or solvents in which a compound containing a small amount of nitrile or a compound containing ether is further combined thereto are desirably used.

As nonaqueous solvents of nonaqueous electrolytes, ionic liquids can be used. In this case, cation types and anion types are not particularly limited. However, from the viewpoints of low viscosity, electrochemical stability, and hydrophobic property, the use in combination of, as cations, a pyridinium cation, an imidazolium cation, and a quaternary ammonium cation and, as an anion, a fluorine-containing imide-based anion is particularly desirable.

Further, as solutes used in nonaqueous electrolytes, publicly known lithium salts that have hitherto been generally used in nonaqueous electrolyte secondary batteries can be used. As such lithium salts, lithium salts containing one or more types of elements among P, B, F, O, S, N, and Cl can be used. Specifically, lithium salts, such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, $LiPF_2O_2$, and mixtures of these salts can be used. In order to increase high charge-discharge rate characteristics and durability of nonaqueous electrolyte secondary batteries, in particular, it is desirable to use $LiPF_6$.

As solutes, a lithium salt in which an oxalate complex is used as the anion can also be used. As a lithium salt in which an oxalate complex is used as the anion, in addition to LiBOB (lithium-bis oxalate borate), there can be used a lithium salt having an anion in which $C_2O_4^{2-}$ is coordinated at a center atom, such as $Li[M(C_2O_4)_xR_y]$ (in the formula, M represents a transition metal or an element that is selected from the elements of Group XIII, Group XIV, and Group XV in the periodic table; R represents a group that is selected from halogen, an alkyl group, and a halogen-substituted alkyl group; x represents a positive integer; and y represents 0 or a positive integer). Specific examples include $Li[B(C_2O_4)F_2]$, $Li[P(C_2O_4)F_4]$, and $Li[P(C_2O_4)_2F_2]$. However, in order to form a stable film on a negative electrode surface in a high-temperature environment, using LiBOB is most desirable.

Not only may the solutes above be singly used, but also two or more types thereof may be mixed and used. Although the concentration of the solutes is not particularly limited, it is desirable that the concentration thereof be 0.8 to 1.7 moles per one liter of nonaqueous electrolyte. Further, in a usage requiring electric discharge for a large current, it is desirable that the concentration of the solutes be 1.0 to 1.6 moles per one liter of nonaqueous electrolyte.

The rectangular battery 1 of the present disclosure includes the electrode body 14 that includes the plurality of stacked positive electrode plates 20, the rectangular outer casing 11 that has an opening and that accommodates the electrode body 14, the cover plate 12 that seals the opening and that is provided with the positive-electrode-side external terminal 18 on a side opposite to the side of the electrode body 14, and the positive electrode collector terminal 40 that is electrically connected to the positive-electrode-side external terminal 18 and that is disposed inside the rectangular outer casing 11. Each positive electrode plate 20 includes the corresponding positive electrode active material arrangement portion 21 and the corresponding positive electrode collector tab 22, the positive electrode active material arrangement portion 21 including the corresponding plate-like positive electrode core body and the corresponding positive electrode active material containing layer 24 that is provided at the core body, and the positive electrode collector tab 22 being integrated with the corresponding positive electrode core body and protruding from the corresponding positive electrode active material arrangement portion 21. Each positive electrode collector tab 22 includes the corresponding curved portion 22a that is positioned between the corresponding positive electrode active material arrangement portion 21 and the positive electrode collector terminal 40 in the Z direction and that has at least a part thereof curved, and the end (the corresponding height-direction extending portion 22b and the corresponding flat portion 22c) that is positioned at the corresponding curved portion 22a on a side opposite to the side of the corresponding positive electrode active material arrangement portion 21. Each end includes the joint portion that is joined and electrically connected to the positive electrode collector terminal 40.

Therefore, each positive electrode collector tab 22 includes the corresponding curved portion 22a that is positioned between the corresponding positive electrode active material arrangement portion 21 and the positive electrode collector terminal 40 in the Z direction and that has at least a part thereof curved, and each curved portion 22a is loose (flexed). Therefore, when the rectangular battery 1 is subjected to shock or vibration, each curved portion 22a becomes a shock-absorbing portion, and the positive electrode collector tabs 22 are not excessively pulled. Therefore, it is possible to suppress damage to the positive electrode collector tabs 22.

The plurality of positive electrode collector tabs 22 that are included in the plurality of positive electrode plates 20 may be disposed so as to overlap each other and may constitute positive-electrode-side tab bundles 41, and the positive electrode collector terminal 40 may include a plate-like portion 45. Positive-electrode-side covers (clamping portions) 50 that clamp, along with the edge-portion end surfaces of the plate-like portion 45, the positive-electrode-side tab bundles 41 may be further provided.

According to the structure above, when the electrode body 14 is inserted into the rectangular outer casing 11, a part of each positive-electrode-side tab bundle 41 can be clamped by the positive electrode collector terminal 40 and the positive-electrode-side covers 50, so that it is possible to suppress sideways spreading of the positive-electrode-side tab bundles 41 towards the side of the rectangular outer casing 11. Therefore, even if the curved portions 22a in which the positive-electrode-side tab bundles 41 are loose are provided, it is possible to prevent the positive-electrode-side tab bundles 41 from coming into contact with the side surfaces of the rectangular outer casing 11. Consequently, even if the curved portions 22a in which the positive-electrode-side tab bundles 41 are loose are provided, it is possible to smoothly accommodate the electrode body 14 inside the rectangular outer casing 11, and to prevent the positive-electrode-side tab bundles 41 from coming into contact with the rectangular outer casing 11 and from becoming damaged. Further, since the positive-electrode-side tab bundles 41 do not come into contact with the side surfaces of the rectangular outer casing 11, the rectangular battery 1 can be one having high quality.

The positive-electrode-side covers (the clamping portions) 50 and the positive electrode collector terminal 40 may be connected to each other by connecting portions 42. The positive-electrode-side covers 50, the positive electrode collector terminal 40, and the connecting portions 42 may be integrated with each other, and may define recessed portions 43 that accommodate parts of the positive-electrode-side tab bundles 41.

According to the structure above, the structure that prevents the positive-electrode-side tab bundles 41 from coming into contact with the side surfaces of the rectangular outer casing 11 when inserting the electrode body 14 into the rectangular outer casing 11 can be easily formed at a low cost. Further, when, with the connection portions of the positive-electrode-side covers 50 that are connected with the corresponding connecting portions 42 being fulcra, the positive-electrode-side covers 50 in the XY planes are bent so as to rotate in the directions of arrows C, and thereby a part of each positive-electrode-side tab bundle 41 is clamped by the corresponding positive-electrode-side cover 50 and the positive electrode collector terminal 40 in the X direction, the positive-electrode-side tab bundles 41 can be considerably more easily and reliably clamped by the positive-electrode-side covers 50 and the positive electrode collector terminal 40.

Further, each positive electrode collector tab 22 may include a flat portion 22c that extends along the upper surface 46 of the plate-like portion 45 of the positive electrode collector terminal 40 on the side of the cover plate 12 in the Z direction. When seen from the Z direction, overlapping portions 48 where all of the flat portions 22c in all of the positive electrode collector tabs 22 included in the positive-electrode-side tab bundles 41 overlap each other may exist. The joint portion of each positive electrode collector tab 22 that is joined to the positive electrode collector terminal 40 may be included in the overlapping portions 48, and the length of each overlapping portion 48 in the protruding direction of the positive electrode collector tabs 22 may be greater than or equal to 3 mm.

According to the structure above, since the length of each overlapping portion 48 in the protruding direction of the positive electrode collector tabs 22 is greater than or equal to 3 mm, all of the positive electrode collector tabs 22 included in the positive-electrode-side tab bundles 41 can be reliably joined to the plate-like portion 45.

The present disclosure is not limited to the embodiment and the modifications thereof above, and various improvements and changes are possible within the scope of the matters described in the claims of the present application and within the scope of equivalents thereof.

For example, in the embodiment above, (i) regarding the positive electrode side, the structure in which each positive electrode collector tab 22 is positioned between the corresponding positive electrode active material arrangement portion 21 and the positive electrode collector terminal 40 in the Z direction, and includes the corresponding curved portion 22a that has at least a part thereof curved is described. In addition, (ii) the structure in which a part of each positive-electrode-side tab bundle 41 is clamped by the corresponding positive-electrode-side cover (the clamping portion) 50 and the positive electrode collector terminal 40 is described. Further, (iii) the structure in which the positive-electrode-side covers (the clamping portions) 50 and the positive electrode collector terminal 40 are integrated with each other is described. Further, there is described (iv) the structure in which each positive electrode collector tab 22 includes the corresponding flat portion 22c that extends along the upper surface 46 of the plate-like portion 45 of the positive electrode collector terminal 40 on the side of the cover plate 12 in the Z direction; in which when seen from the Z direction, the overlapping portions 48 where all of the entire flat portions 22c in all of the positive electrode collector tabs 22 included in the positive-electrode-side tab bundles 41 overlap each other exist; in which the joint portion of each positive electrode collector tab 22 that is joined to the positive electrode collector terminal 40 is included in the overlapping portions 48; and in which the length of each overlapping portion 48 in the protruding direction of the positive electrode collector tabs 22 is greater than or equal to 3 mm.

However, the rectangular battery need not include, of the four structures (i), (ii), (iii), and (iv), three structures (ii), (iii), and (iv) excluding the structure (i) described first in which each positive electrode collector tab includes the corresponding curved portion. One or more of the four structures (i), (ii), (iii), and (iv) may be provided on the negative electrode side. As long as the negative electrode side includes one of more of the four structures, even on the negative electrode side, it is possible to acquire one or more of the operational effects corresponding to one or more operational effects that are provided by the corresponding one or more of the structures on the positive electrode side. Of the four structures above, the structure (i) described first in which each collector tab includes the corresponding curved portion may be provided only on the positive electrode side, only on the negative electrode side, or on both the positive electrode side and the negative electrode side.

Figure 11:
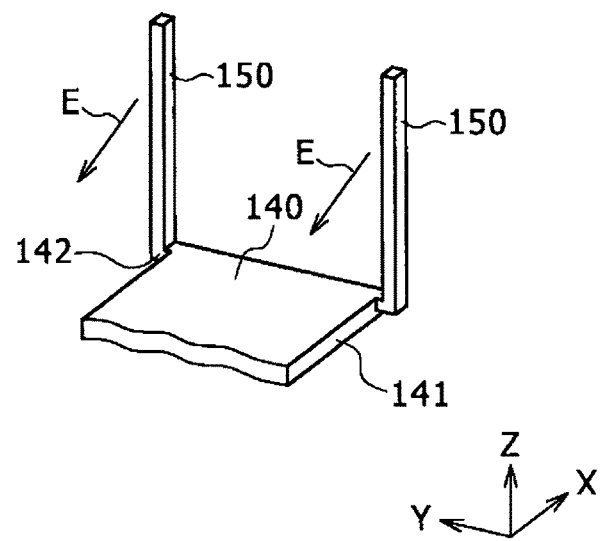
FIG. 11 is a perspective view showing a part of an integral structure in which a collector terminal and each clamping portion are integrated with each other in a modification.

The case in which with the connection portions of the positive-electrode-side covers (the clamping portions) 50 that are connected with the corresponding connecting portions 42 being fulcra, the positive-electrode-side covers 50 are bent in XY planes so as to rotate in the directions of arrows C, and thereby a part of each positive-electrode-side tab bundle 41 is clamped by the corresponding positive-electrode-side cover 50 and the corresponding edge portion of the positive electrode collector terminal 40 in the X direction is described. However, as shown in FIG. 11, that is, a perspective view of an integral structure of clamping portions 150 and a collector terminal 140 in a modification, it is possible to use a structure in which on at least one of the positive electrode side and the negative electrode side, with connection portions of the clamping portions 150 that are connected with connecting portions 142 being fulcra, the clamping portions 150 are bent in YZ planes so as to rotate in the directions of arrows E, and thereby a part of each tab bundle (not shown) is clamped by the corresponding clamping portion 150 and a corresponding edge portion 141 of the collector terminal 140 in the X direction.

The case in which the positive-electrode-side covers (the clamping portions) 50 are connected to the positive electrode collector terminal 40 by the connecting portions 42 and the positive-electrode-side covers 50 and the positive electrode collector terminal 40 are integrated with each other is described. However, on at least one of the positive electrode side and the negative electrode side, the clamping portions need not be integrated with the collector terminal and may be a single member. In this case, the clamping portions may be made of a metal or a material other than a metal, such as a resin. Alternatively, the clamping portions need not be integrated with the collector terminal and need not be a single member, and may be integrated with an insulator (a member corresponding to the insulating cover 60 (refer to FIG. 3)) that is fitted into the rectangular outer casing. In this case, when the clamping portions are made of the same material as the insulator (the insulating cover), the clamping portions may be integrated with the insulator (the insulating cover). Alternatively, when the clamping portions are made of a metal, the clamping portions may be integrated with the insulator made of, for example, a resin by being joined (fixed) to the insulator by using an adhesive or performing welding.

The case in which the plurality of positive electrode collector tabs 22 are separated in two and are disposed so as to overlap each other and form two bundles is described. However, on at least one of the positive electrode side and the negative electrode side, the collector tabs may be formed in one bundle, or may be disposed so as to be separated in three or more, and form three or more bundles. Here, when the collector tabs are formed in one bundle, as shown in FIG. 12, the collector tabs can be joined to a collector terminal.

Figure 12:
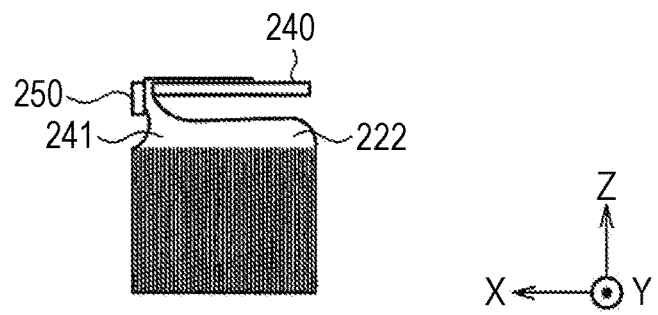
FIG. 12 is a schematic view for illustrating an example of joining collector tabs to a collector terminal when the collector tabs are disposed so as to overlap each other to form one bundle.
Figure 13:
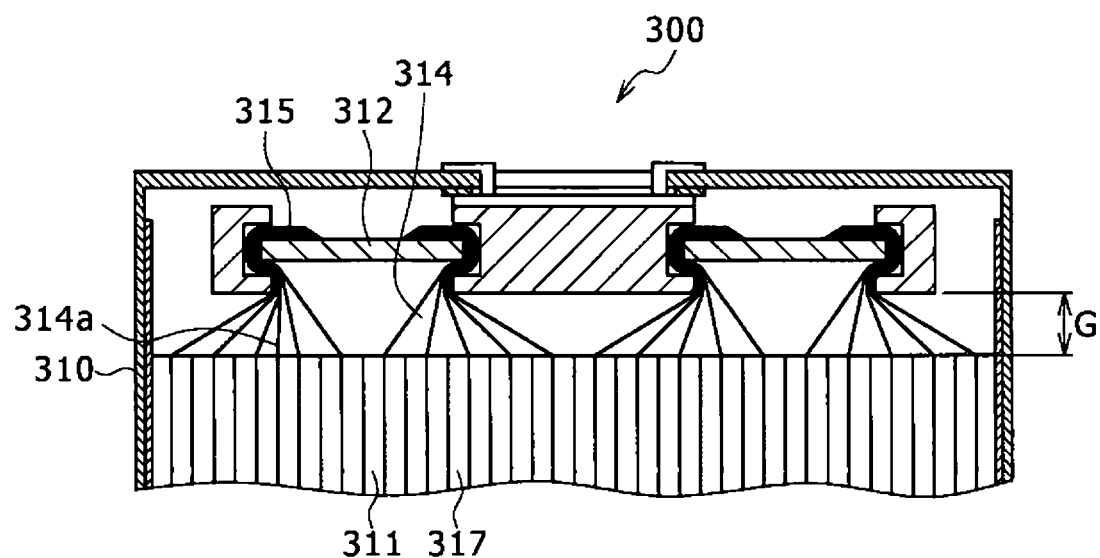
FIG. 13 is a sectional view illustrating a structure of a rectangular secondary battery of a first related art.
Figure 14:
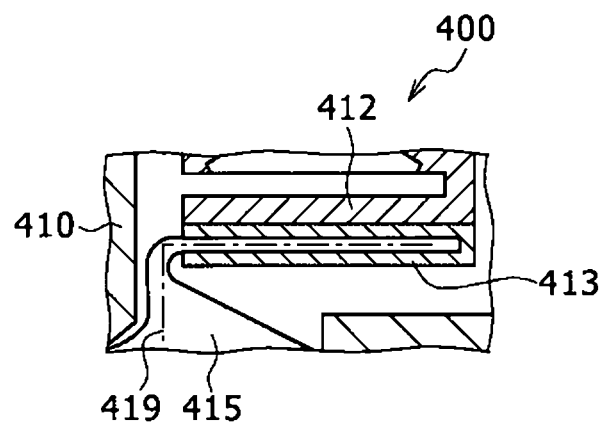
FIG. 14 is a sectional view illustrating a structure of a rectangular secondary battery of a second related art.

In FIG. 12, reference numeral 222 denotes the collector tabs, reference numeral 240 denotes the collector terminal, reference numeral 241 denotes a tab bundle, and reference numeral 250 denotes a clamping portion. According to this modification, since all of the plurality of collector tabs 222 only need to be collector foils on one side in the X direction, it is possible to efficiently join the collector tabs 222 to the collector terminal 240 in a short time.

REFERENCE SIGNS LIST 11 rectangular outer casing
12 cover plate
14 electrode body
18 positive-electrode-side external terminal
19 negative-electrode-side external terminal
20 positive electrode plate
21 positive electrode active material arrangement portion
22 positive electrode collector tab
22a curved portion
22b height-direction extending portion
22c flat portion
24 positive electrode active material containing layer
30 negative electrode plate
40 positive electrode collector terminal
41 positive-electrode-side tab bundle
42, 142 connecting portion
43 recessed portion
45 plate-like portion of positive electrode collector terminal
46 upper surface of plate-like portion
48 overlapping portion
50 positive-electrode-side cover
60 insulating cover
140, 240 collector terminal
150, 250 clamping portion
222 collector tab
241 tab bundle
X direction thickness direction of positive electrode plate (stacking direction)
Z direction height direction of rectangular outer casing

The invention claimed is:

1. A rectangular secondary battery comprising:
an electrode body that includes a plurality of stacked electrode plates;
a rectangular outer casing that has an opening and that accommodates the electrode body;
a cover plate that seals the opening and that is provided with an external terminal on a side opposite to a side of the electrode body; and
a collector terminal that is electrically connected to the external terminal and that is disposed inside the rectangular outer casing,
wherein each electrode plate includes an active material arrangement portion and a collector tab, the active material arrangement portion including a plate-like core body and an active material containing layer that is provided at the core body, the collector tab being integrated with the core body and protruding from the active material arrangement portion,
wherein each collector tab includes a curved portion and an end, the curved portion being positioned between the active material arrangement portion corresponding thereto and the collector terminal in a height direction of the rectangular outer casing and having at least a part thereof curved, the end being positioned at the curved portion on a side opposite to a side of the active material arrangement portion,
wherein the end of the collector tab includes a portion thereof disposed directly on a surface of the collector terminal facing away from the active material arrangement portion of each electrode plate,
wherein each end includes a joint portion that is joined and electrically connected to the collector terminal,
wherein the collector tabs that are included in the plurality of electrode plates are disposed so as to overlap each other and constitute a tab bundle,
wherein the tab bundle includes a proximal end thereof directly connected to the electrode body, and a distal end thereof directly connected to the collector terminal and including the joint portion, and
the proximal end and the distal end of the tab bundle overlap each other in the height direction,
wherein the collector terminal includes a plate-like portion having a major surface directly adjacent to the joint portion of each end of the collector tab, and an edge-portion end surface extending in a thickness direction of the plate-like portion and apart from the joint portion of each end of the collector tab,
wherein the rectangular secondary battery further comprises a clamping portion having a surface thereof opposite the edge-portion end surface of the plate-like portion and extending in the thickness direction of the plate-like portion, so as to clamp a portion of the tab bundle apart from the joint portion, wherein said portion of the tab bundle is directly sandwiched, in a direction perpendicular to the thickness direction of the plate-like portion, between the surface of the clamping portion and the edge-portion end surface of the plate-like portion.

2. The rectangular secondary battery according to claim 1, wherein the rectangular secondary battery further comprises:
a connecting portion configured to pivotably connect the clamping portion to the collector terminal,
wherein the clamping portion, the collector terminal, and the connecting portion are integrated with each other and define a recessed portion that accommodates a part of the tab bundle.

3. The rectangular secondary battery according to claim 1, comprising:
an insulator that is disposed between an inner surface portion of the rectangular outer casing and the clamping portion, the inner surface portion being positioned on a side opposite to a side of the edge-portion end surface with respect to the clamping portion,
wherein the clamping portion is integrated with the insulator, or is fixed to the insulator.

4. The rectangular secondary battery according to claim 1, wherein each collector tab includes a flat portion that extends along an upper surface of the plate-like portion on a side of the cover plate in the height direction,
wherein, when seen from the height direction, an overlapping portion where all of the flat portions in all of the collector tabs included in the tab bundle overlap each other exists,
wherein the joint portion is included in the overlapping portion, and
wherein a length of the overlapping portion in a protruding direction of the collector tabs is greater than or equal to 3 mm.

5. The rectangular secondary battery according to claim 1, further comprising:

an insulating cover having a substantially U-shaped cross section press-fitted to inner surfaces of a pair of side plates of the rectangular outer casing, wherein the insulating cover is disposed between an inner surface portion of the rectangular outer casing and the clamping portion, the inner surface portion facing the edge-portion end surface of the plate-like portion via the clamping portion, so as to force the clamping portion toward the edge-portion end surface of the plate-like portion.

* * * * *